United States Patent
Shuster (10) Patent No.: US 10,187,500 B2
(45) Date of Patent: *Jan. 22, 2019

(54) GYROSCOPIC ALERTING MECHANISM FOR PORTABLE COMMUNICATIONS DEVICE

(71) Applicant: Gary S. Shuster, Fresno, CA (US)

(72) Inventor: Gary S. Shuster, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/402,942

(22) Filed: Jan. 10, 2017

(65) Prior Publication Data
US 2017/0149938 A1    May 25, 2017

Related U.S. Application Data

(63) Continuation of application No. 14/887,241, filed on Oct. 19, 2015, now Pat. No. 9,544,407, which is a
(Continued)

(51) Int. Cl.
*G08B 6/00* (2006.01)
*H04M 1/02* (2006.01)
(Continued)

(52) U.S. Cl.
CPC .......... *H04M 1/026* (2013.01); *G06F 1/1656* (2013.01); *G06F 1/1694* (2013.01); *H04M 1/72522* (2013.01); *H04M 2250/12* (2013.01)

(58) Field of Classification Search
CPC ......... H04M 2250/12; H04M 1/72522; H04M 1/026; H04M 1/72536; H04M 1/72588; H04M 19/047; H04M 1/663; H04M 1/72533; H04M 11/04; H04M 1/67; H04M 1/72525; H04M 1/7253; H04M 1/72577; H04M 2250/10; H04M 3/5231; H04M 7/003; G06F 1/1656; G06F 1/1694; G06F 19/3418; G06F 19/3456; G06F 9/4446; G06F 1/163; G06F 3/0227; G06F 3/0482; G06F 3/04842; G06F 3/04847; G06F 3/0485; G06F 3/04883; H04W 4/001; H04W 4/02; H04W 4/16; H04W 8/22;
(Continued)

(56) References Cited

U.S. PATENT DOCUMENTS

9,167,061 B2 * 10/2015 Shuster ................. H04M 1/026
9,544,407 B2 *  1/2017 Shuster ................. H04M 1/026
(Continued)

*Primary Examiner* — Daniel Previl
(74) *Attorney, Agent, or Firm* — Sherrie Flynn; Coleman & Horowitt LLP (57) ABSTRACT

A portable communications device, such as a mobile phone, includes a novel tactile alerting mechanism capable of alerting the user of an incoming communication or other event. A gyroscopic mechanism is coupled to a housing of the portable communications device and controlled by a processor. The processor is configured to control a spin velocity of the gyroscopic mechanism based on receiving an alert of an incoming call or message, or detecting a fall. The gyroscopic mechanism may spin up or change a spin state to provide a tactile signal via the housing of the communications device, by imparting stabilizing force to the housing that can be felt by a person wearing the communications device, or to change an orientation of the device while falling.

20 Claims, 3 Drawing Sheets

Related U.S. Application Data continuation of application No. 13/853,991, filed on Mar. 29, 2013, now Pat. No. 9,167,061.

(60) Provisional application No. 61/617,498, filed on Mar. 29, 2012.

(51) Int. Cl.
*H04M 1/725* (2006.01)
*G06F 1/16* (2006.01)

(58) Field of Classification Search
CPC ..... H04W 4/008; H04W 4/046; H04W 12/02; H04W 12/12; H04W 4/005; H04W 4/006; H04L 67/12; H04L 67/125; H04L 41/0879; H04L 41/5064; H04L 67/22; H04L 12/2827; H04L 63/1416; H04L 12/282; H04L 2012/2841; H04L 41/0833; H04L 41/22; H04Q 2209/43; H04Q 2209/823; H04Q 9/00; A61B 5/0022; A61B 5/1112; A61B 5/1117; A61B 5/6898; A61B 5/747; A61B 2560/0406; A61B 2560/0431; A61B 5/02055; A61B 5/02427; A61B 5/0408; G05B 15/02; G05B 2219/2642; Y02B 60/50; G04G 21/00; G08B 21/025; G08B 21/0275; G08B 21/18; G08B 21/22; B01L 2200/025; B01L 2200/0642; B01L 2200/0668; B01L 2200/12; B01L 2200/147; B01L 2300/021; B01L 2300/022; B01L 2300/024; B01L 2300/042; B01L 2300/044; B01L 2300/045; B01L 2300/046
USPC ... 340/407.1, 539.13, 539.26, 426.2, 426.21, 340/426.11, 429, 426.25, 426.34, 340/446–447, 455, 460, 693.9, 463–464
See application file for complete search history.

(56) References Cited

U.S. PATENT DOCUMENTS

| | | | |
|---|---|---|---|
| 2004/0133966 A1* | 7/2004 | Ebihara | A41D 13/00 2/247 |
| 2005/0053313 A1* | 3/2005 | Lucas | B65B 61/16 383/16 |
| 2006/0063137 A1* | 3/2006 | Robbins | G05B 17/02 434/61 |
| 2011/0084807 A1* | 4/2011 | Logan | H04Q 9/00 340/10.1 |
| 2013/0090103 A1* | 4/2013 | Kim | H04M 1/72577 455/418 |

* cited by examiner

GYROSCOPIC ALERTING MECHANISM FOR PORTABLE COMMUNICATIONS DEVICE

CROSS-REFERENCE TO RELATED APPLICATION

This application is a continuation of U.S. patent application Ser. No. 14/887,241 filed Oct. 19, 2015, (U.S. Pat. No. 9,544,407 issued Jan. 10, 2017), which is a continuation of U.S. patent application Ser. No. 13/853,991, filed Mar. 29, 2013 (U.S. Pat. No. 9,167,061 issued Oct. 20, 2015), which claims priority under 35 U.S.C. § 119(e) to provisional application Ser. No. 61/617,498, filed Mar. 29, 2012, which applications are expressly incorporated by reference herein, in their entireties.

FIELD

The present disclosure is directed towards a mobile communications device that includes a component for providing a tactile alert signal to the user using a gyroscopic mechanism, or for stabilizing the device during free fall conditions.

DESCRIPTION OF THE RELATED ART

Mobile communications devices, for example, mobile telephones, typically include various signaling components to alert users when an incoming communications signal or message is received. Signaling components are typically configured to provide three types of alert signals: visible alerts, such as messages displayed on a display screen, or flashing lights; audible alerts, such as ringtones, and tactile alerts, such as vibrating the device using a motor to drive an unbalanced load inside of the device housing. Tactile alerts are useful for providing alerts when visible or audible alerts are not desirable or effective, such as when a mobile phone is in the user's pocket and the user is in a location where audible alerts are either forbidden or can't reliably be heard because of ambient noise levels. However, in many circumstances, such as when a cellular phone is placed inside a purse or loose-fitting clothing, the vibration of the communications device is not perceptible by the user. Visible alerts are also not perceptible in similar circumstances. The user may therefore unintentionally fail to respond to alert signals for incoming messages.

In addition, mobile communications devices are often encased in functionally designed, sleek, compact housings to enhance portability and durability of the device.

However, functionally designed housings tend to be quite similar in appearance, and do not by their outward appearance reflect the unique personalities and preferences of their users, or excite consumer interest in the devices. The same can be said for tactile alerting features of these devices, which are very uniform across the marketplace and therefore also fail to attract consumer interest despite their functional merits.

Personal communications devices are small, hand held, and often damaged by being dropped and striking a hard surface. Once a device has been dropped, there may be little that can be done to prevent damage except catching it in flight. Few people are alert and able to reliably catch an accidentally dropped phone before it hits the ground.

It would be desirable, therefore, to provide a portable mobile communications device, for example, a wireless mobile phone, with tactile alerting and/or fall damage prevention features that overcome these and other limitations of the prior art.

SUMMARY

Methods, apparatus and systems for gyroscopic alerting or orienting in a mobile communications device or the like are described in detail in the detailed description, and certain aspects are summarized below. This summary and the following detailed description should be interpreted as complementary parts of an integrated disclosure, which parts may include redundant subject matter and/or supplemental subject matter.

An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, an apparatus may include a wireless communications transceiver circuit configured to transmit and receive wireless communication signals, the circuit including a processor configured to detect an incoming signal in response to input received by the transceiver circuit. The apparatus may further include a housing enclosing the transceiver circuit. The apparatus may further include a gyroscopic mechanism fixed to the housing and coupled to the processor, wherein the processor is configured to control rotational velocity of the gyroscopic mechanism in response to detecting the incoming signal.

In further, optional aspects of the apparatus, the processor may be configured to increase velocity of a rotor of the gyroscopic mechanism in response to detecting the incoming signal. The gyroscopic mechanism may include, for example, a magnetized rotor. In further optional aspects, the processor may be configured to detect the incoming signal, for example, a paging signal for an incoming message or voice call. In the alternative, the incoming signal may include data from a motion and/or orientation sensor, indicating that the apparatus is in a free fall condition (e.g., has been dropped).

In another aspect, the processor may be configured to control a rotational speed of the rotor based on elapsed time after detecting the incoming signal without detecting a user response to the incoming message or voice call. In an alternative aspect, the processor may be configured to control at least one of a rotational speed of a rotor of the gyroscopic mechanism or orientation of a spin axis of the rotor in response to input from at least one of a motion sensor and an orientation sensor, according to an algorithm tending to stabilize the apparatus in a preferred orientation during a free fall condition. A preferred orientation may include, for example, an orientation in which minimal damage to fragile components of the apparatus would be caused by impacting the ground or other object.

The apparatus may further include a braking component for slowing rotation of a rotor in the gyroscopic mechanism. The braking component may include, for example, an electro-magnetic brake configured to generate electrical power from the rotor. The processor may be configured, for example, to activate the braking component in response to detecting a user response to the incoming message or voice call.

The apparatus may further include a sensor coupled to the processor, for sensing whether or not the apparatus is being worn adjacent to a user's body. In such embodiments, for example, the processor may be further configured for activating the gyroscopic mechanism in response to data from the sensor.

In other aspects, a method for alerting a user of a wireless communications device may be performed by the apparatus summarized above, or by a different apparatus. The method may include a sequence or other combination of operations, for example receiving a wireless signal using a receiver, providing an on-board alert signal in response to receiving the wireless signal, using a control circuit, and activating a gyroscopic mechanism fixed to the housing and coupled to the control circuit, thereby controlling rotational velocity of the gyroscopic mechanism in response to the alert signal. The incoming signal may include, for example, a paging signal for an incoming message or voice call.

In other aspects, the method may further include activating the gyroscopic mechanism further comprises accelerating a rotor to a rotational velocity, thereby imparting a stabilizing force to the apparatus housing. Activating the gyroscopic mechanism may further include accelerating a rotor in a structure transmitting a gyroscopic stabilizing force to the rotor's rotational axis, thereby imparting a stabilizing force to the apparatus housing.

In another aspect, the method may further include terminating the on-board alert signal, and initiating a deceleration procedure in response to termination of the on-board alert signal. For example, the deceleration procedure may include braking a rotor of the gyroscopic mechanism. For further example, braking the rotor may further include transferring energy from the rotor to an electrical battery using an electro-magnetic braking system.

In another aspect, the method may include controlling a rotational speed of the rotor based on elapsed time after providing the on-board alert signal without detecting a user response to the incoming message or voice call. Controlling the rotational speed of the rotor may include, for example, increasing the rotor velocity in predetermined stages based on the elapsed time.

In another aspect, the method may include receiving sensor data and determining whether or not a communications device is being worn on a user's body based on the sensor data. For example, the method may include determining whether or not to initiate a gyroscopic alert procedure based on whether or not the sensor data indicates that the communications device is being worn on a user's body.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a mobile smart phone or computing device. Similarly, an article of manufacture may be provided, including a non-transitory computer-readable storage medium holding encoded instructions, which when executed by a processor, cause a computer to perform the methods and aspects of the methods as summarized above.

BRIEF DESCRIPTION OF THE DRAWINGS

In the figures and detailed description that follows, like numerals are used to indicate like elements found in one or more of the figures.

DETAILED DISCLOSURE

A solution is to incorporate a gyroscopic element in the device. The gyroscope is not used for the purpose of determining whether the device is moving or determining direction despite device movement, although such use may be an additional use of the gyroscope.

Gyroscopes have the characteristic of rigidity in space. Indeed, the primary characteristic of a rotating gyroscope is rigidity in space, or gyroscopic inertia. Newton's First Law provides that a body in motion tends to move in a constant speed and direction unless disturbed an external force. As the gyroscope spins, it becomes a body in motion that resists movement.

Turning to the problem of a cellular phone vibration that is not perceived, we take a relatively extreme example of a phone in a user's oversized shorts pocket. The phone is small, and thus light, and as the user walks the phone would be in contact with the user's leg only a fleetingly small percentage of the time. If a call comes in, the gyroscope spins up. As the gyroscope reaches a sufficient rotational speed, the gyroscope begins to exhibit sufficient rigidity in space to cease moving freely with the user's leg movements, and if contained in an appropriate structure, will exert a stabilizing force. At that point, as the user's leg moves, it will repeatedly bump against the device, which then creates a far more perceptible signal for the user. This may be combined with vibration and/or sound to create a more effective signaling system.

One variant is to have the device react depending on how much rigidity is necessary to properly signal given a certain amount of motion. In one implementation, the device may characterize the amount, type, and length of motion it is experiencing (optionally also using GPS data or audio data as well) and measure how frequently a call is missed at certain rotational speeds. If, for example, the user never perceives a signal at 1,000 rpm when walking rapidly or when walking on campus, sometimes answers calls at 2,000 rpm in those circumstances, and always answers at 5,000 rpm, the device would learn to spin up in those circumstances to something greater than 2,000 rpm and less than 5,000 rpm, and eventually learn a minimum speed necessary to get a desired rate of ring perception. The rate of ring perception is preferably measured against the power consumption requirements of a gyroscope. Optionally, a lower spin rate may be chosen when the battery level is lower, or a higher rate chosen at a high battery level or at a time of day when the user typically is about to charge the phone.

In an aspect, the gyroscope may immediately begin to spin down when it is contacted by a hand or receives other indicia that it is being answered, such as, for example, a change in gait, speed, or orientation. Not only is power conserved by spinning down early, but a fully spun up gyroscope may interfere with the use of the device. In another implementation, the gyroscope may be spun up, reach a desired speed, and then be powered off and allowed to spin down. Because the gyroscope would not instantly spin down, it would continue to provide signaling benefits even after power is cut to it.

In another aspect, spinning the gyroscope provides a stabilizing force exerted on the user in the event the phone or other communications devices is worn or held close to the body. When the communications device is elsewhere, e.g., in a purse or sitting on a table, the stabilizing force will not be felt and will therefore not be effective as an alerting signal. Accordingly, a gyroscopic alerting system may include one or more sensors to detect whether or not the communications device is being worn close to the body. Such sensors may include, for example, a temperature sensor, microphone, accelerometer, chemical sensor, or some combination of the foregoing. A processor in the gyroscopic alerting system may analyze data from the sensor or sensors and determine whether or not the communications device is being held or worn close to the body. The processor may perform such analysis periodically in in response to detecting events, and record a most current state determination in a memory location. When an alert signal is to be provided, the processor may determine whether to use a gyroscopic alert, or some other alerting signal, based on the current (most recent) status recorded in the memory.

Another variant is to utility a separate gyroscopic signaling device. For example, a purse may be connected to a phone (such as by Bluetooth™) and a device incorporated into the purse (or simply located in the purse) may contain a gyroscope that spins up when the phone rings. In this manner, a gyroscope larger than the device may be utilized, as may a gyroscope that draws more power than desirable. A wearable gyroscope, such as on a watch, may also be utilized.

Because an efficient gyroscope does not generate as much noise as a vibrating phone (a vibrating phone is typically noisy precisely because of the intentional inefficiency of the movement of its motor, caused by leaving elements out of balance), the gyroscopic notification system permits notification of a signal in environments where stealth is important. Whether it is a lecture or a hospital room, a gyroscope, particularly a small one on a sensitive portion of the body, such as a watch, may be used to provide a signal without disturbing or even alerting others to the signal. This may also be utilized to provide silent feedback, such as notifying an undercover reporter that their hidden camera is nearly out of batteries.

In another implementation, a gyroscope may be used to assist users in navigating to a destination. For example, a user may wish to use the GPS in their iPhone to navigate on foot to an office in a city, but does not desire to have the phone out all of the time (perhaps for safety or other reasons). As the user approaches a place where a decision as to direction is about to be made (such as an intersection), the gyroscope may spin up if they are to keep going in the same direction. In this way, if they make a turn they are not supposed to make, they feel feedback immediately indicating that the turn was improper. For such purposes, it may also be possible to have two gyroscopes (or even vibrating devices), one indicating right turn, the other indicating left turn, that provide such feedback. Even a single device could provide such feedback by using multiple vibration patterns.

The gyroscope may be incorporated into a phone case, and may utilize the phone's power source or a separate power source.

In one implementation, the gyroscope may be made quite small by affixing it to a highly sensitive portion of the body. For example, a gyroscope incorporated in a hearing aid or other audio transducer worn on the ear would not need to be very large or consume much power to allow the user to determine that it has become rigid in space.

A gyroscope may also be utilized to maintain proper attitude in a device, such as to prevent it from being damaged if dropped. By measuring the orientation of a device as it is falling, the gyroscope can spin up slightly, and increase its spin rate, as the device reaches the orientation likely to cause the least amount of damage when it falls. Take, for example, a phone where the manufacturer determines that a fall flat on the back of the phone is the least likely to cause damage. An inertial motion sensor on the phone determines that it is moving down at a rate that indicates it has been dropped.

Orientation sensors (whether using gravity, smaller gyroscopes such as currently in the iPhone™, or otherwise) determine the attitude of the phone in space. As the attitude changes, the path of the phone, including spin, can be calculated. Optionally other sensors, such as a camera or an echolocation system, may be used to gather additional data such as the distance to the ground or attitude and path.

The phone may have multiple gyroscopes to provide rigidity in space for different parts of the phone, in order to cause reorientation in space or a change to the path or spin of the phone by spinning up or not spinning up or by varying their speeds, or by changing the axis of spin. For example, as the computer calculates that the phone can be made to hit the ground in the position least likely to cause damage (or in the position least likely to cause damage picked from among the possible positions to achieve given the parameters of the falls), the one or more gyroscopes are spun up in order to maintain the phone in the least damaging position. In the alternative, for example, a mechanical actuator may be activated to change the axis of spin of a gyroscope, or each spin axis of multiple gyroscopes, to move and stabilize a free-falling personal electronic device in a desired orientation minimizing anticipated impact damage.

Such technology could also be used for other devices, such as laptops, or even larger items. Optionally, the device could be equipped with "impact zones" so that the gyroscope(s) would orient the phone to hit on zones specifically designed to be hit. In one variation, the gyroscope may remain spun up in order to prevent the phone from bouncing or further falling. Indeed, having a gyroscope spun up even without using it to direct the attitude of the phone during the fall may reduce damage by preventing rolling or bouncing after the initial impact. The system may also be part of a phone case. For laptop drives or other motion-sensitive devices, when motion is sensed a variable speed drive platter (which functions as a gyroscope) may be be spun faster to stabilize the device. The effect of the stabilizing force may be greater for small devices such as net books or similar devices, where the ratio of the angular momentum of the spinning gyroscope (e.g., magnetic hard drive) to the angular momentum of the entire falling device may be large enough to provide appreciable motion dampening benefits.

In an application for a vehicle, a gyroscope may be similarly adapted. When sensors detect the vehicle will roll over (or tumble), potentially limited to only when it is clear the steering has or will imminently be lost, a gyro spins up to prevent rollover or limit the number of rolls.

In another variation, a large device used for supporting people or supporting other elements (such as a walker or a bicycle) is equipped with a gyroscope. As the sensors determine that the device is about to move in a manner that could cause injury, or if they determine that making the device more rigid in space may prevent injury, the gyroscope may spin up. Multiple gyroscopes may be used in the manner described above for falling cell phones.

Figure 1:
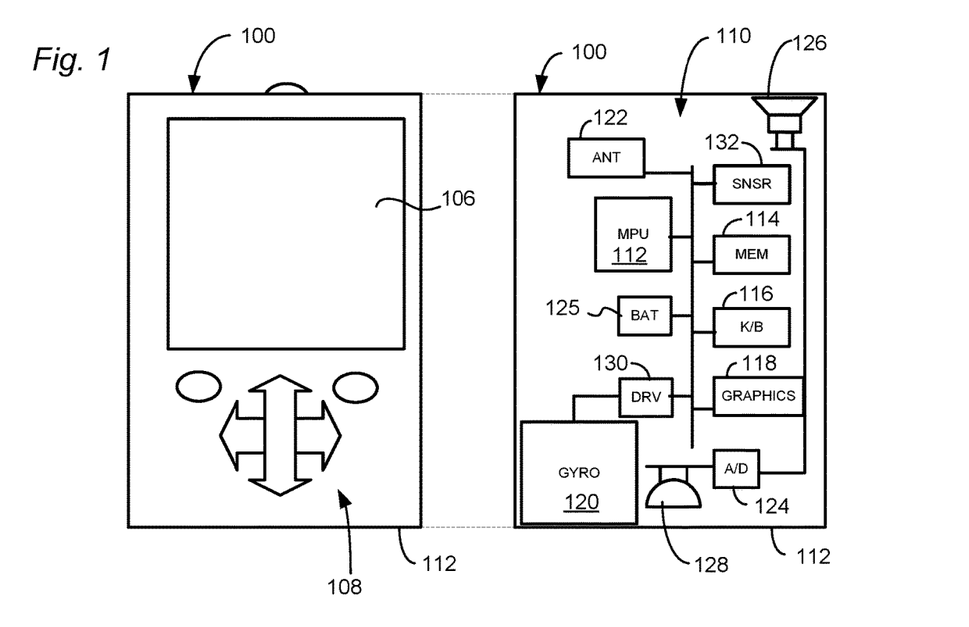
FIG. 1 is schematic exterior view and block diagram showing elements of a mobile communications device with a tactile alerting system including a gyroscopic mechanism.

The foregoing technology may be implemented in a communications apparatus, as follows. FIG. 1 shows elements of a mobile communications device 100, for example a mobile phone, with a tactile alerting system including a gyroscopic mechanism 120. Gyroscopic mechanism 120 may be made of any suitable rigid or semi-rigid structural material, for example, a polymer material or metal. Device 100 may include conventional components for a mobile phone, for example, a display screen 106, keypad 108 and transceiver circuit 110, adapted as described below. Device 100 may be configured in a tablet form with an outer housing 112 defining an exterior envelope. Housing 112 optionally functions as a frame to secure components of the device 100 in place. In the alternative, or in addition, a separate frame component may be located inside the housing.

The transceiver circuit 110 may include elements as conventionally used in mobile phones or the like, but adapted to control the device's tactile alerting system. Such elements may include, for example, a processor or microprocessing unit 112, and one or more memory devices 114 coupled to the processor for holding program instructions and data. Instructions for controlling the tactile alerting system and other functions of the communications device 100 may be stored in the memory device 114 and loaded into the processor 112 at run time. Further elements may include a user interface 116 for processing signals from a user input device, such as a keypad or touchscreen, into input for the processor 112; and a graphics processor 118 providing a signal to the display device 106 in response to input from the processor 112. The circuit 110 may include an antenna 122 for receiving wireless communications signals coupled to the signal processor 112 or an intermediate processor.

The signal processor may translate digital communications signals or alert tones into audible output via a digital-to-analog processor 124 and speaker 126. Audible input from a microphone 128 may be converted into digital data using the analog-to-digital mode of processor 124. Power components for the circuit may include a battery 125 and associated power electronics for supplying electrical power to elements of circuit 100.

Figure 2:
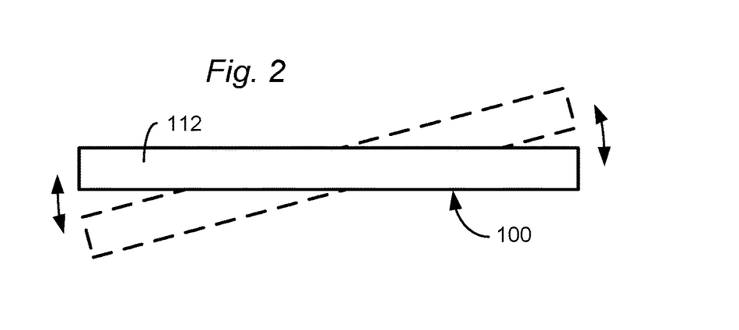
FIG. 2 is a side view illustrating movement of a mobile communications device due to a gyroscopic force.

Circuit 100 may further comprise a motor driver 130 and a motor coupled to control rotation of a rotor of the gyroscopic mechanism 120. The motor 120 may comprise a miniature rotary electrical motor. The motor may be coupled to the rotor via a magnetic, electro-magnetic and/or mechanical member. In an embodiment, an electromagnetic stator may spin up a relatively massive permanent-magnet or electro-magnet rotor. The gyroscope mechanism may include a mechanical and/or electro-braking system for slowing rotation of the gyroscope. A torque may be imparted to the housing 112 via a spindle, bearing, or the like. As shown in FIG. 2, when the rotor is spinning, the housing 112 resists motion via a rigid coupling between a spindle of the rotor and the housing. The housing may therefore press on the user's body if held against the user's body while the user moves normally. The user may sense the force exerted by the rotor as it resists displacement and thereby be silently alerted to an incoming call or message.

The processor 112 may be programmed to evaluate incoming signals from the antenna and determine when to output an alert signal to system components. For example, in response to an incoming phone call, the processor may generate a code to system components indicating an incoming voice call. Other alert codes may indicate different alert events such as an incoming voice message, text message, or email.

System components and/or the processor 112 may respond to alert signals by playing selected ring tones and displaying messages.

The circuit 100 may further comprise a sensor 132 coupled to the processor 112, for example via a bus or other coupling. The sensor may be, or may include, for example, one or more of a temperature sensor, microphone, camera, accelerometer, chemical sensor, or some combination of the foregoing. The processor 112 may be configured to analyze data from the sensor or sensor and determine whether or not the communications device is being held or worn close to the body. The processor may be configured to perform such analysis periodically in in response to detecting events, and record a most current state determination in a memory location. The processor may further be configured to determine whether to use a gyroscopic alert, or some other alerting signal, based on the current (most recent) status recorded in the memory.

Figure 3:
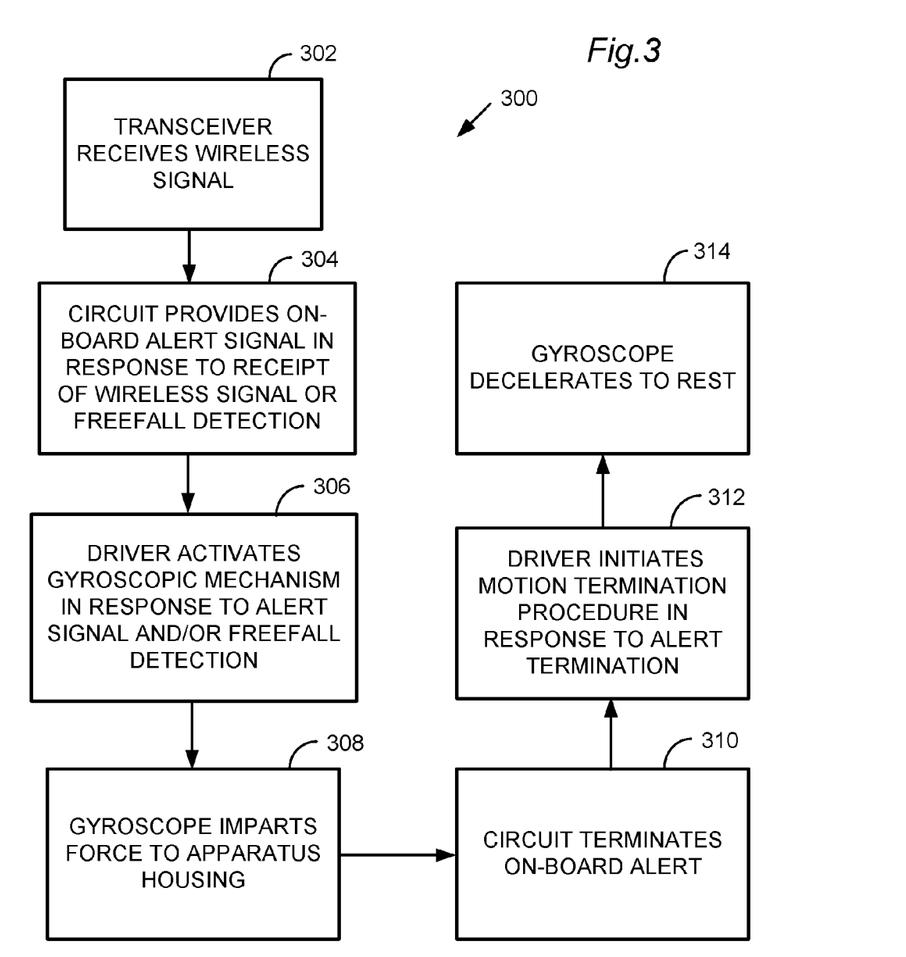
FIG. 3 is a flow chart showing elements of a method for operating a mobile communications device to control a tactile alerting and/or free fall orienting system having a complex duty cycle.

In accordance with the foregoing examples of communications devices with tactile alerting systems based on gyroscopic forces, FIG. 3 shows elements of a method 300 for operating a mobile communications device to control a tactile alerting system having a complex duty cycle, as described herein. At 302, the transceiver circuit in the device receives a wireless communications signal, such as, for example, an incoming phone call signal or a mail message transmission. For further example, the alert signal may be generated based on data from one or more motion sensors, including the gyroscope itself, indicating that the communications device is in free fall (e.g., has been dropped). The transceiver circuit may generate a responsive alert signal 304 to other system components, indicating receipt of the signal or detection of free fall. At 306, a motor driver of the circuit activates a gyroscopic mechanism in response to the alert signal, with power supplied by a power source from within the portable communications device. In the alternative, or in addition, the motor driver may actuate a mechanical actuator that in turn tilts a rotational axis of the gyroscope.

At 308, the gyroscopic mechanism imparts a force and/or motion to a housing for the transceiver circuit. This external motion may be non-vibratory in that it includes no tactile high-frequency vibration component, such as generated by prior-art vibrating motors. It may include a oscillating or low frequency pulsating motion cycle, for example, a motion cycle between about one cycle per ten seconds and ten cycles per second. The motion may be clearly visible as well as tactile, and should be of a magnitude adequate to overcome light resistance from loose clothing or the like. The force may be controlled to provide movement of the communications device designed to be tactilely sensed (e.g., felt) by a person holding or wearing the device against or nearly against her body. In the alternative, in the case that the activation 306 is triggered by detection of free fall, the force exerted by spinning up and/or tilting the spin axis of the gyroscope may be controlled so as to stabilize the communications devices in free fall, so that it is more likely to impact the ground in an orientation least likely to damage fragile components of the device.

At 310, the transceiver circuit terminates the alert signal. Termination may occur in response to a variety of conditions as known in the art, for example the user picking up the call or message, the call going unanswered for a period of time, the user requesting that the alert be stopped by selecting an "ignore" input, or cessation of free fall being detected by one or more motion sensors. At 312, the circuit initiates a motion termination procedure in response to termination of the alert. The procedure may be designed to brake the rotation of the gyroscope rotor in an efficient fashion. This can be done using an electro brake that may recover energy for storage in a battery. The gyroscope rotor may thereby decelerate to a de-energized rest condition 314, where it does not interfere with use of the communications device and can be reactivated when needed to provide a tactile indication of further alert signals. The tactile alerting cycle may thereby be repeated as often as desired.

Figures 4, 5:
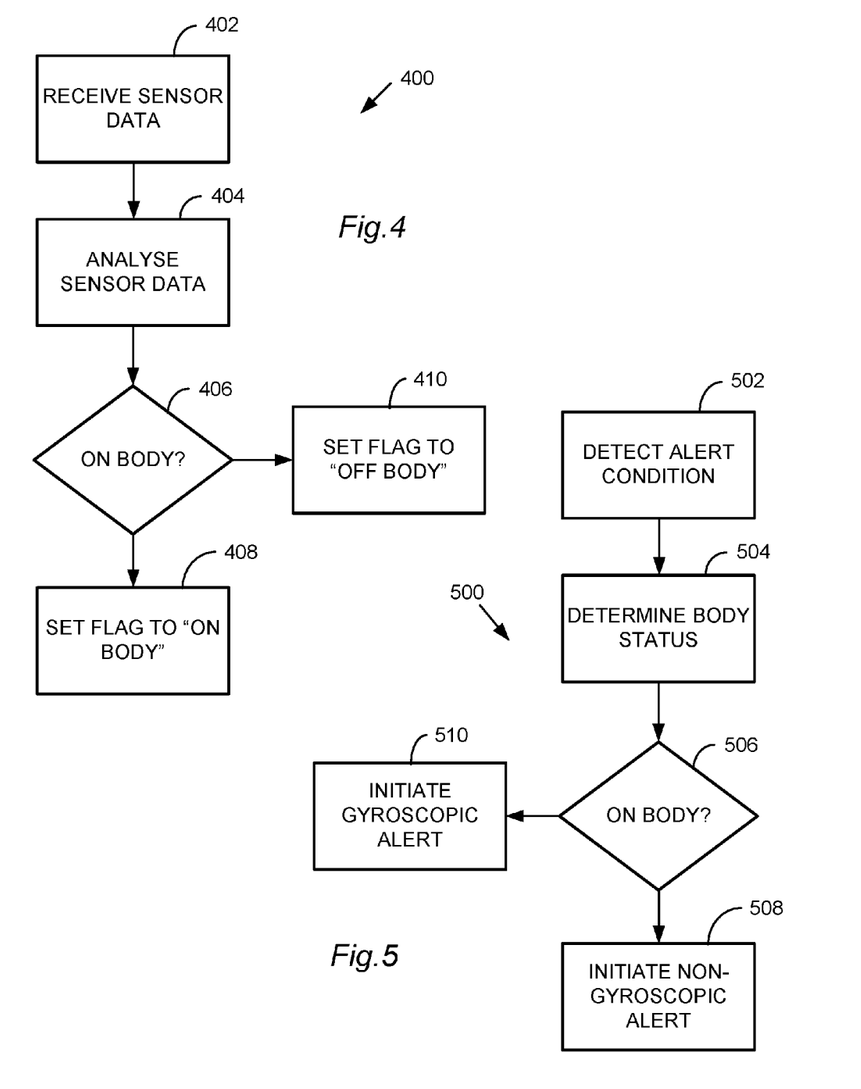
FIG. 4 is a flow chart illustrating an algorithm or procedure for using sensor data to determine whether or not a communications device is being worn on a user's body.
FIG. 5 is a flow chart illustrating an algorithm or procedure for determining whether or not to initiate a gyroscopic alert procedure based on whether or not a communications device is being worn on a user's body.

FIG. 4 illustrates an algorithm or procedure 400 for using sensor data to determine whether or not a communications device is being worn on a user's body. The procedure 400 may be performed periodically, or in response to detecting occurrence of a defined event. At 402, a processor receives sensor data from one or more sensors. The sensor data may include, for example, temperature data, motion or acceleration data, audio data, photographic data, chemical concentration data, or other data that may be used to determine how close the device is to a user's body. At 404, the processor analyses the sensor data to make a determination 406 as to whether or not the communications device is being worn or held on a user's body. For example, an audio sensor or electrodes may detect a heartbeat, a temperature sensor may detect a body temperature, a motion sensor may detect a pattern consistent with normal body motions, a chemical sensor may detect carbon dioxide or other chemical signature characteristic of the human body. In an alternative, or in addition, the communications device may be provided with a simple on/off functionality via a user interface, by which a user may manually indicate whether the gyroscopic alert should be used. The processor may combine information from two or more sources to reach a probabilistic estimate as to whether the device is being worn on a human body.

If, at 406, the processor determines the device is being worn or held close to a body, the processor may, at 408, set a flag or variable to indicate a current state of the device is "on body." Conversely, if the processor determines the device is not being worn or held close to a body, the processor may, at 410, set a flag or variable to indicate a current state of the device is "off body." Such flags or variables may be used a the process 500 illustrated in FIG. 5.

FIG. 5 illustrates an algorithm or procedure 500 for determining whether or not to initiate a gyroscopic alert procedure based on whether or not a communications device is being worn on a user's body. At 502, a processor may detect an alert condition for the device, e.g., an incoming message or call. At 504, the processor may check the current status using a method or outputs as illustrated in FIG. 4, to determine 506 whether or not the device is being worn or held on a body. If, at 506, the processor determines that the device is being worn or held close to a body, the processor may, at 510, initiate a gyroscopic alert procedure, for example as illustrated in FIG. 3.

Conversely, if the processor determines that the device is not being worn or held close to a body, the processor may, at 508, initiate a non-gyroscopic alert procedure, for example an audible and/or visible alert.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. A non-transitory computer-readable medium (e.g., non-transitory magnetic, electronic or optical medium) may hold instructions, that when executed by a processor, cause an apparatus as described herein to perform one or more operations as described in the present disclosure.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system comprising:
a first device configured to receive wireless communications signals;

a second device, wirelessly coupled to the first device;
the first device, upon receipt of an incoming signal, determines whether the incoming signal should trigger a gyroscopic alert in the second device;
upon determining that the incoming signal should trigger the gyroscopic alert, the first device sends an alert request signal to the second device;
the second device, upon receipt of the alert request signal, actuates a gyroscopic alerting mechanism fixed to or incorporated into the second device, wherein the actuated gyroscopic mechanism exerts a stabilizing force on the second device;
wherein the stabilizing force is sufficiently strong to be perceived by a human holding the second device.

2. The system of claim 1, wherein the second device is larger than the first device.

3. The system of claim 1, wherein the gyroscopic alerting mechanism is larger in at least one dimension than the first device.

4. The system of claim 1, wherein the second device is integral with a handbag.

5. The system of claim 1, wherein the second device is contained within a handbag.

6. The system of claim 1, wherein the second device is a watch.

7. The system of claim 1, wherein the second device is worn on or in the ear.

8. A system comprising:
a device configured to generate an alert signal upon receipt of a wireless actuation signal; the alert signal at least including an alert provided by actuation of a gyroscopic alerting mechanism sufficient to cause human-perceptible rigidity in space.

9. The system of claim 8, where the gyroscopic alerting mechanism is substantially silent.

10. The system of claim 8, where the gyroscopic alerting mechanism is incorporated into a phone case.

11. The system of claim 8, where the gyroscopic alerting mechanism is incorporated in an audio transducer worn on the ear.

12. The system of claim 8, where the gyroscopic alerting mechanism is incorporated into a bag.

13. The system of claim 8, where the gyroscopic alerting mechanism is located in a bag.

14. A system comprising:
a portable device;
the device equipped with at least one gyroscope strong enough to provide some amount of rigidity in space for the device;
the device further equipped with processor coupled to memory and at least one sensor that detects when the device is not in a desired orientation;
the device further configured to actuate the at least one gyroscope upon determining that the device is not in a desired orientation.

15. The system of claim 14, where the device is a vehicle.

16. The system of claim 14, where the device is an assistive walking device.

17. The system of claim 14, where the gyroscope continues to spin until the device is no longer in an undesired orientation.

18. The system of claim 14, where the device is a portable phone.

19. The system of claim 14, where the device is a tablet computer.

20. The system of claim 14, where the device is a case for holding one of a portable phone or tablet computer.

* * * * *